United States Patent [19]

Axthammer

[11] Patent Number: 4,966,257

[45] Date of Patent: Oct. 30, 1990

[54] SHOCK ABSORBING OR OSCILLATION DAMPER DEVICE

[75] Inventor: Ludwig Axthammer, Hambach, Fed. Rep. of Germany

[73] Assignee: Fichtel & Sachs AG, Schweinfurt, Fed. Rep. of Germany

[21] Appl. No.: 365,927

[22] Filed: Jun. 12, 1989

[30] Foreign Application Priority Data

Jun. 15, 1988 [DE] Fed. Rep. of Germany ....... 3820333

[51] Int. Cl.⁵ .............................................. F16F 9/36
[52] U.S. Cl. ................................ 188/322.17; 384/52; 384/58
[58] Field of Search ...................... 188/322.16, 322.17, 188/322.18; 384/50, 52, 58

[56] References Cited

U.S. PATENT DOCUMENTS

| | | | |
|---|---|---|---|
| 2,349,957 | 5/1944 | Greve | 384/52 |
| 2,983,553 | 5/1961 | Dexter | 384/52 |
| 3,347,603 | 10/1967 | Ignatjev | 384/58 X |
| 4,346,945 | 8/1982 | Tsuboi | 384/52 |

FOREIGN PATENT DOCUMENTS

| | | | |
|---|---|---|---|
| 3445461 | 6/1989 | Fed. Rep. of Germany | 188/322.17 |
| 0088243 | 5/1983 | Japan | 188/322.17 |

OTHER PUBLICATIONS

Fichtel & Sachs Brochure entitled "Function and Workshop Hints for Vehicle Parts," No. 850506 (1985 ed.).

Primary Examiner—Duane A. Reger
Attorney, Agent, or Firm—Brumbaugh, Graves, Donohue & Raymond

[57] ABSTRACT

A shock absorber comprises a tube with a cavity therein and a piston rod extending through one end of the tube. At this end of the tube there is provided a gasket. Moreover, for guiding the piston rod, there are provided guiding rollers. These guiding rollers are distributed about the axis of the tube and engage the piston rod by a concave circumferential face, the curvature of which substantially corresponds to the curvature of the piston rod.

13 Claims, 1 Drawing Sheet

SHOCK ABSORBING OR OSCILLATION DAMPER DEVICE

BACKGROUND OF THE INVENTION

This invention relates to a shock absorber or oscillation damper and moreover particularly to a shock absorber to be used as or as a part of a suspension strut in a vehicle. A suspension strut is to be understood as a component of a vehicle which, besides a shock absorbing function, has also a wheel guiding function and is therefore subject to transverse forces and to bending moments. For more detailed information on suspension struts it is referred to a brochure SACHS Function and Workshop Hints for Vehicle Parts No. 850506, edition 1985, and more particularly to pages 6 and 7 of this brochure.

It is usual with shock absorbers to provide a guiding sleeve for the piston rod such that a sliding friction occurs on axial movement of the piston rod. In case of suspension struts as defined above, the friction occurring between the piston rod and the sliding sleeve is considerable as a result of the transverse forces and bending moments. This friction forces reduce the driving comfort of the vehicle and result in high wear of the guiding sleeve. This wear of the guiding sleeve may result in undesirable reduction of the damping forces. Moreover, in response to strong transverse forces, a bending of the piston rod may occur, and as a result of such bending the piston rod may be clamped within the guiding sleeve such that the oscillation damper becomes effective only at relatively large axial forces.

STATEMENT OF THE PRIOR ART

From German Patent No. 3,445,461 it has been known to provide an angularly movable guide system for the piston rod in which a limited axial movement of the guiding sleeve is possible. In this construction there is provided a ball bearing between an external circumferential surface of the guiding sleeve and a component of the tube system such that small axial movements are resisted by small friction forces due to an entrainement of the guiding sleeve. From the transverse forces there results, however, a high engagement pressure between the balls and the guiding sleeve, on the one hand, and the balls and the tube system, on the other hand. These engagement pressures result in an undesirable radial play in the area of the ball bearing. Moreover, this construction requires a great number of components including springs and washers which must be assembled in a complicated way.

OBJECT OF THE INVENTION

It is an object of the present invention to provide a guiding system in a shock absorber or oscillation damper with small friction forces resisting axial movement of the piston rod along the total stroke of the piston rod.

SUMMARY OF THE INVENTION

In view of the above object a shock absorbing device comprises at least one tube member having a tube axis and two ends and defining at least one cavity therein. A piston rod member extends axially inwards and outwards of said cavity through one of said ends and is guided adjacent to one of said ends by a sealing and guiding assembly. The sealing and guiding assembly includes a plurality of guiding rollers. These guiding rollers are distributed about said tube axis and are rotatably mounted on a roller carrier about roller axes lying in at least one plane which is substantially perpendicular to said tube axis with each of said roller axes being substantially perpendicular to a radius of the tube axis. The guiding rollers have—when regarded in a cross-section containing the respective roller axes—a concave circumferential guiding surface adapted to an external circumferential surface of the piston rod member.

Due to the concave shape of the circumferential guiding surface of the roller the engagement pressure resulting from transverse forces in the area of the sealing and guiding assembly is small. The friction between the piston rod member and the guiding rollers are very small and substantially no clamping action occurs as a result of a bending of the piston rod member.

It is desirable that the guiding surface has a radius of curvature slightly larger than the radius of the external surface of the piston rod member. As a result of this preferential but not necessary feature, the engagement face between the guiding rollers and the piston rod is relatively small at small transverse forces and becomes larger by elastic deformation if large transverse forces occur. The curvature of engagement between the guiding rollers and the piston rod member is not strictly circular but approaches a circular configuration.

A particularly compact design which can be easily manufactured can be obtained in that the roller carrier has a plurality of slots receiving the guiding rollers. These slots may be open in one axial direction such that they can be most easily manufactured. Preferably, the slots are open in an axial direction away from the respective other end of the tube member, i.e. the end which is remote from the end at which the sealing and guiding assembly is provided. According to a preferred embodiment the number of the guiding rollers is four, and the guiding rollers are distributed in equal angular distances about the tube axis. Such the number of slots is also four and subsequent slots have an angular distance of 90°. Such slots can be easily manufactured on machine tools.

The roller carrier may be covered at the end thereof remote from said other end of the tube member by a covering unit, said covering unit being in sealing engagement with both an inner circumferential surface of the tube member and an external circumferential surface of the piston rod member. As a result of this additional feature the guiding rollers are completely encapsulated within the shock absorbing device and may be also accessible to at least traces of a liquid filling medium within the tube such that lubrication of the roller bearings is warranted. The covering unit may comprise an axially inner annular cover member which is cranked towards the other end of the tube member adjacent to a radially outer edge of the inner cover member. A radially outer gasket member can such be accommodated radially between the cranked portion of the axially inner cover member and the inner circumferential surface of the tube member. On the other hand, the covering unit may comprise an axially outer annular cover member with a radially inner edge facing the piston rod member. This radially inner edge may carry a radially inner gasket member engaging the external circumferential surface of the piston rod member.

Moreover, the axially outer cover member may axially engage the radially outer gasket member such as to compress this gasket member and maintain it in sealing engagement with the internal circumferential surface of the tube member.

The guiding roller may be rotatably mounted on mounting pins by roller bearings. Such the minimum friction occurs and high bearing forces can be transmitted by the guiding rollers.

The guiding rollers may be mounted on mounting pins which are received by pin receiving bores of the roller carrier.

The mounting pins may be pressed by at least one of their respective ends into respective bores such as to fix said mounting pins along their respective axes.

Another very easy possibility of assembling the roller carrier, the pins and the guiding rollers consists in that the mounting pins are fixed within the pin receiving bores by abutment plugs engaging respective ends of the mounting pins. These abutment plugs may be accommodated within recesses of the roller carrier and may be integral with an annular cover member adjacent to the roller carrier.

The present invention is particularly applicable to double-tube shock absorbing devices having a radially inner tube member and a radially outer tube member. Such double-tube shock absorbers are well known. The radially inner tube member receives an axially inner portion of the piston rod member, and an annular space is defined radially between the radially inner tube member and the radially outer tube member. Such double-tube shock absorbers are known from the above-mentioned brochure SACHS Function and Workshop Hints for Vehicle Parts. It is referred particularly to page 2 of this brochure. The cavity within the inner tube member receives the piston rod member and a piston unit fixed to the inner end of the piston rod member. A bottom valve is provided at the end of the tube members which are remote from the piston rod guiding and sealing assembly. By this bottom valve the cavity of the inner tube member is in liquid connection with the annular space between the inner tube member and the outer tube member. The piston unit fixed to the piston rod member is provided with damping valve means interconnecting the working chambers on both sides of the piston unit. The cavity within the inner tube member is filled with a liquid and the annular space is partially filled with this liquid and partially filled with gas or air. In such double-tube shock absorbers the roller carrier of this invention may act as a centering member between the radially inner tube member and the radially outer tube member. Moreover, the radially inner tube member may be axially fixed between the roller carrier and a bottom portion of the radially outer tube member, which bottom portion is provided at the other end of the radially outer tube member, i.e. at the end thereof remote from the guiding and sealing assembly.

It is desirable to close the inner tube member adjacent to the guiding and sealing assembly such that air can escape but liquid flow is substantially prevented. Therefore, the radially inner tube member may be covered adjacent to the roller carrier by an annular disc surrounding the piston rod member. This annular disc may be press-fitted within the roller carrier, and a sealing member may be accommodated within the roller carrier. This sealing member engages the external circumferential surface of said piston rod member in a substantially liquid-tight manner and can be axially fixed with respect to the roller carrier by the annular disc.

The roller carrier may be pre-assembled with at least part of the guide rollers, the annular disc, the axially inner cover member, the axially outer cover member, the radially outer gasket member, the radially inner gasket member and the sealing member before being introduced into the tube member. More particularly the roller carrier may be pre-assembled with the guide rollers, the annular disc and the sealing member. The pre-assembled unit is inserted as one block into the tube member or tube members such that assembling of the shock absorber is most easy.

The shock absorber of this invention may be part of a suspension strut, e.g. such that the above-mentioned outer tube member is directly connected with a wheel carrier and is connected by its bottom to a linkage system of the wheel suspension, whereas the outer end of the piston rod member is connected to the body framework of the motor vehicle such as shown on page 7 of the above-mentioned brochure. Alternatively, the shock absorbing device may be part of a suspension strut insert which is inserted and fixed within an additional tube. In this case, the additional tube is provided with the wheel carrier, the lower end of the additional tube is connected to the linkage of the wheel suspension and the outer end of the piston rod member extends beyond an upper end of the additional tube and is connected to the body frame of the vehicle. The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereinafter with reference to an embodiment shown in the accompanying drawings, in which.

DESCRIPTION OF THE PREFERRED EMBODIMENTS

Figure 2:
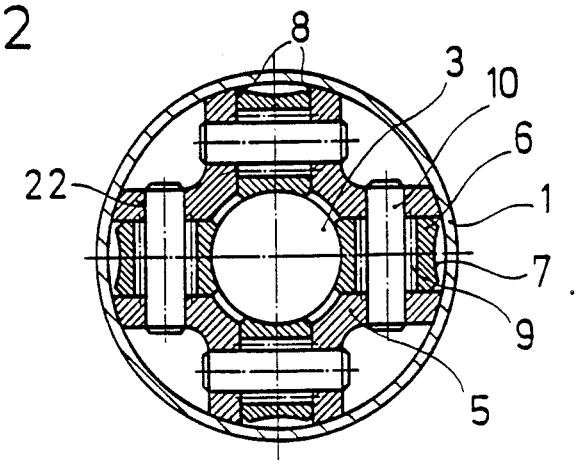
FIG. 2 shows a cross-section of the piston rod sealing and guiding assembly according to line II—II of FIG. 1.
Figure 1:
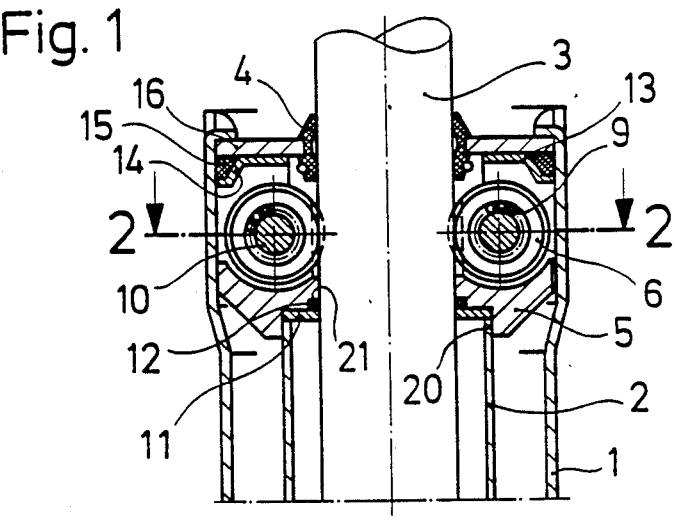
FIG. 1 shows the area of the sealing and guiding assembly of a double-tube shock absorber in a longitudinal section.

In the embodiment of FIGS. 1 and 2 a container or outer tube member 1 is concentric with a cylinder or inner tube member 2. For centering and axially fixing of the inner tube member 2 within the outer tube member 1, there is provided a roller carrier 5. The piston rod member 3 cooperates with a gasket member 4, by which the cavity of the outer tube member is sealed against atmosphere. In the roller carrier 5 there are provided roller receiving slots 8. These slots 8 receive rollers which are mounted by roller bearings 9 on pins 10. Each guiding roller has a circumferential guiding surface 7 which is adapted to the external circumferential surface of the piston rod 3. A disc 11 is accommodated within a bore 20 of the roller carrier 5. This disc 11 is adjacent to a groove 21, said groove 21 receiving a sealing member 12. The sealing member 12 is axially fixed by the disc 11. This sealing member 12 closes the relatively large gap between the piston rod member 3 and the roller carrier 5. The sealing member 12 is e.g. a slit annular member. The slot of this annular member may be such defined that the liquid-filled chamber within the inner tube 2 may be ventilated through this slot. At the upper end of the roller carrier the slots 8 and other cavities of the roller carrier are covered by an annular cover member 13. This cover member 13 is cranked at 14. The cranked portion receives a gasket member 15, particularly an O-ring. On assembling the shock absorber, an axial force is exerted onto a further cover member 16, which axial force is transmitted through the cover member 13, the roller carrier 5, the disc 11 and the tube member 2 to the bottom of the outer tube member 1, which bottom is not shown in FIG. 1. The axial force is maintained by the upper end of the outer tube member 1 being crimped over the cover member 16. The gasket member 15 is compressed between the cover members 16 and 13 and is such maintained in sealing engagement with the inner circumferential face of the outer tube member 1. As one can see, the axial distance between the guiding rollers 6 and the gasket member 4 is very small. If the piston rod member 3 is bent by high transverse forces, the sealing lips of the gasket member 4 are deflected only slightly due to this short axial distance. Such the sealing action of the gasket member 4 is maintained also under extreme conditions, e.g. at cold weather.

The guiding and sealing assembly can be pre-assembled outside the shock absorber. The guiding rollers 6 are inserted into the slots and are rotatably mounted by rollers 9 on the pins 10. The pins 10 are pressed by at least one end thereof in a respective bore 22 of the roller carrier 5. The slots 8 and the bores 22 for the pins 10 can be manufactured on a machine tool very easily and precisely, particularly if the angular distance between subsequent slots 8 is 90° as shown in FIG. 2. Also the sealing member 12 and the disc 11 can be pre-assembled with the roller carrier 5 outside the outer tube member 1. For this pre-assembling it is desirable that the disc 11 is press-fitted within the bore 20. After the pre-assembled roller carrier 5 has been inserted into the outer tube member 1, the cover members 13 and 16 are positioned on the roller carrier 5 together with the gasket 15. Hereupon, the upper end portion of the outer tube member 1 is crimped over the cover member 16.

Figure 3:
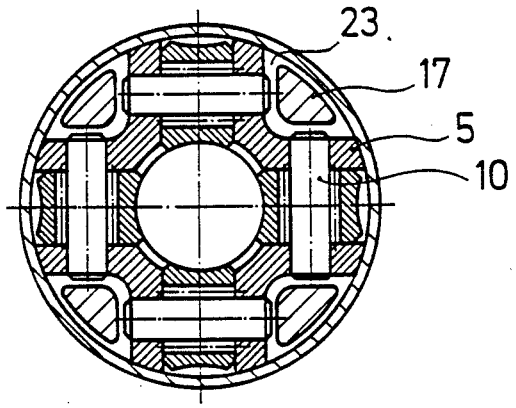
FIG. 3 shows a section according to FIG. 2 of a modified embodiment.

The embodiment of FIG. 3 differs from the embodiment of FIGS. 1 and 2 in that said abutment plugs 17 are inserted into recesses 23 of the roller carrier 5. These abutment plugs 17 can be integral with the cover member 13, particularly if this cover member is a plastic article. This embodiment is particularly interesting if the pins 10 are only slightly pressed into bores 22. So the pins are prevented from axial movement by the abutment plugs 17.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A shock absorbing device comprising at least one tube member (1, 2), said tube member (1, 2) having a tube axis and two ends and defining at least one cavity therein, and further comprising a piston rod member (3), said piston rod member (3) extending axially inwards and outwards of said cavity through one of said ends and being guided adjacent to one of said ends by a sealing and guiding assembly (5, 6, 4), said sealing and guiding assembly (5, 6, 4) including a plurality of guiding rollers (6) being distributed about said tube axis and being rotatably mounted on a roller carrier (5) about roller axes lying in at least one plane which is substantially perpendicular to said tube axis with each of said roller axes being substantially perpendicular to a radius of said tube axis, said guiding rollers (6) having with respect to a cross-section containing the respective roller axes a circumferential guiding surfaces (7) adapted to an external circumferential surface of said piston rod member (3), said roller carrier (5) being covered at the end thereof remote from said other end of said tube member (1, 2) by a covering unit (13, 16, 14, 4), said covering unit (13, 16, 14, 4) being in sealing engagement with both an inner circumferential surface of said tube member (1) and said external circumferential surface of said piston rod member (3), with said covering unit (13, 16, 14, 4) comprising an axially inner annular cover member (13) being cranked towards said other end of said tube member (1) adjacent to a radially outer edge of said inner cover member, a radially outer gasket member (15) being accommodated radially between said cranked portion (14) of said axially inner cover member (13) and said inner circumferential surface of said tube member (1).

2. A shock absorbing device comprising at least one tube member (1, 2), said tube member (1, 2) having a tube axis and two ends and defining at least one cavity therein, and further comprising a piston rod member (3), said piston rod member (3) extending axially inwards and outwards of said cavity through one of said ends and being guided adjacent to one of said ends by a sealing and guiding assembly (5, 6, 4), said sealing and guiding assembly (5, 6, 4) including a plurality of guiding rollers (6) being distributed about said tube axis and being rotatably mounted on a roller carrier (5) about roller axes lying in at least one plane which is substantially perpendicular to said tube axis with each of said roller axes being substantially perpendicular to a radius of said tube axis, said guiding rollers (6) having with respect to a cross-section containing the respective roller axes a circumferential guiding surface (7) adapted to an external circumferential surface of said piston rod member (3), said guiding rollers (6) being mounted on mounting pins (10), said mounting pins (10) being received by pin receiving bores (22) of said roller carrier (5), and said mounting pins (10) being fixed within said pin receiving bores (22) by abutment plugs (17) engaging respective ends of said mounting pins (10), said abutment plugs (17) being accommodated within recesses (23) of said roller carrier (5) and being integral with an annular cover member (13) adjacent to an axial end of said roller carrier (5) remote from said other end of said tube member (1).

3. A shock absorbing device comprising at least one tube member (1, 2), said tube member (1, 2) having a tube axis and two ends and defining at least one cavity therein, and further comprising a piston rod member (3), said piston rod member (3) extending axially inwards and outwards of said cavity through one of said ends and being guided adjacent to one of said ends by a sealing and guiding assembly (5, 6, 4), said sealing and guiding assembly (5, 6, 4) including a plurality of guiding rollers (6) being distributed about said tube axis and being rotatably mounted on a roller carrier (5) about roller axes lying in at least one plane which is substantially perpendicular to said tube axis with each of said roller axes being substantially perpendicular to a radius of said tube axis, said guiding rollers (6) having with respect to a cross-section containing the respective roller axes a circumferential guiding surfaces (7) adapted to an external circumferential surface of said piston rod member (3), said shock absorbing device being a double-tube shock absorbing device having a radially inner tube member (2) and a radially outer tube member (1), said radially inner tube member (2) receiving an axially inner portion of said piston rod member (3), an annular space being defined radially between said radially inner tube member (2) and said radially outer tube member (1), said roller carrier member (5) acting as a centering member between said radially inner tube member (2) and said radially outer tube member (1).

4. A shock absorbing device as set forth in any one of claims 1-3, said guiding surface (7) having a radius of curvature slightly larger than the radius of said external circumferential surface of said piston rod member (3).

5. A shock absorbing device as set forth in any one of claims 1-3, said roller carrier (5) having a plurality of slots (8) receiving said guiding rollers (6), said slots (8) being open in axial direction away from the respective other end of said tube member (1, 2).

6. A shock absorbing device as set forth in claim 1, said covering unit (13, 16, 14, 4) comprising an axially outer annular cover member (16), said axially outer cover member (16) having a radially inner edge, said radially inner edge carrying a radially inner gasket member (4) engaging said external circumferential surface of said piston rod member (3).

7. A shock absorbing device as set forth in any one of claims 1-3, said guiding roller (6) being rotatably mounted on mounting pins (10) by roller bearings (9).

8. A shock absorbing device as set forth in claim 2, said mounting pins (10) being pressed by at least one of their ends into a respective bore (22).

9. A shock absorbing device as set forth in claim 3, said radially inner tube member (2) being axially fixed between said roller carrier (5) and a bottom portion of said radially outer tube member (1), said bottom portion being provided at said other end of said radially outer tube member (1).

10. A shock absorbing device as set forth in claim 9, said radially inner tube member (2) being covered adjacent to said roller carrier (5) by an annular disc (11) surrounding said piston rod member (3), said annular disc (11) being press-fitted within said roller carrier (5), a sealing member (12) being accommodated within said roller carrier (5), said sealing member (12) engaging said external circumferential surface of said piston rod member (3) and being axially fixed with respect to said roller carrier (5) by said annular disc (14).

11. A shock absorbing device as set forth in any one of claim 1-3, said roller carrier (5) being pre-assembled with at least part of guide rollers (6), an annular disc (11), an axially inner cover member (13), an axially outer cover member (16), a radially outer gasket member (15), a radially inner gasket member (4), and a sealing member (12) before being introduced into said tube member (1).

12. A shock absorbing device as set forth in any of claims 1-3 said shock absorbing device being part of a suspension strut.

13. A shock absorbing device as set forth in any one of claims 1—3, said shock absorbing device being part of a suspension strut insert.

* * * * *

UNITED STATES PATENT AND TRADEMARK OFFICE
CERTIFICATE OF CORRECTION

PATENT NO. : 4,966,257

DATED : Oct. 30, 1990

INVENTOR(S) : Axthammer

It is certified that error appears in the above-identified patent and that said Letters Patent is hereby corrected as shown below:

Col. 6, line 11, "surfaces" should read --surface--.

Col. 7, line 5, "surfaces" should read --surface--.

Col. 8, line 24, "claim 1-3" should read --claims 1-3--.

Signed and Sealed this

Twenty-sixth Day of May, 1992

*Attest:*

DOUGLAS B. COMER

*Attesting Officer*     *Acting Commissioner of Patents and Trademarks*